United States Patent [19]
Frick

[11] 3,793,885
[45] Feb. 26, 1974

[54] DIAPHRGAM CONSTRUCTION FOR DIFFERENTIAL PRESSURE TRANSDUCER

[75] Inventor: Roger L. Frick, Minneapolis, Minn.
[73] Assignee: Rosemount Inc., Eden Prairie, Mich.
[22] Filed: Sept. 5, 1972
[21] Appl. No.: 286,287

[52] U.S. Cl. .............................. 73/398 C, 73/407 R
[51] Int. Cl. .............................................. G01l 9/12
[58] Field of Search... 73/398 C, 406, 407 R; 92/98, 92/99, 100

[56] References Cited
UNITED STATES PATENTS

| | | | |
|---|---|---|---|
| 3,195,028 | 7/1965 | Werner et al. | 73/398 C |
| 3,618,390 | 11/1971 | Frick | 73/398 C |
| 3,360,664 | 12/1967 | Straube | 310/8.2 |
| 3,505,875 | 4/1970 | Benner, Jr. | 73/407 R |

Primary Examiner—Donald O. Woodiel
Attorney, Agent, or Firm—Dugger, Johnson & Westman

[57] ABSTRACT

A diaphragm construction for a differential pressure transducer wherein the diaphragm is deflected under pressure, and which has means around the periphery thereof to isolate the diaphragm stresses from the mounting portion of the diaphragm.

12 Claims, 3 Drawing Figures

DIAPHRGAM CONSTRUCTION FOR DIFFERENTIAL PRESSURE TRANSDUCER

BACKGROUND OF THE INVENTION

1. Field of the Invention.

The present invention relates to the diaphragm construction for pressure transducers.

2. Prior Art.

The present application illustrates the improvements in the diaphragm construction over my U.S. Pat. No. 3,618,390, issued Nov. 9, 1971. The differential pressure transducer functions are clearly explained in this patent, and the diaphragm shown in the patent is a "membrane" type diaphragm that is supported against overpressure by internal surfaces of the pressure cell. This same overpressure support is used with the present invention, but the improvements of the diaphragm construction permit the use of a thicker diaphragm so that higher pressure ranges can be sensed, while the adverse effects of very high bending moments in the diaphragm adjacent the mounting edges are reduced.

Insofar as prior art diaphragm constructions are concerned, U.S. Pat. No. 3,505,875, issued to Benner, Jr. on Apr. 14, 1970 shows a diaphragm which is intended to isolate the main portion of the diaphragm from the mounting edge. However, the configuration of the diaphragm in this patent is rather complex, and difficult to manufacture. Also, U.S. Pat. No. 3,360,664, issued to Straube on Dec. 26, 1967 shows a diaphragm used in an accoustic radiating transducer and which is designed with a hinging section to attempt to isolate the main diaphragm from the mounting edges. Again, the particular shape used with this diaphragm does not lend itself well to an application as a differential pressure transducer.

As a matter of general interest, U.S. Pat. No. 2,161,980 issued to Runge et al. on June 13, 1939 shows an elastically oscilating oscillator which is a plate-like device having reduced cross sectional areas between the center portions and the outer portions thereof.

SUMMARY OF THE INVENTION

The present invention relates to a differential pressure transducer diaphragm, wherein the diaphragm has a reduced cross sectional area web portion adjacent its mounting edges to isolate the bending stresses in the diaphragm from the peripheral mounting ring of the diaphragm. The present diaphragm as shown is used in a capacitance pressure sensor wherein pressure will deflect the diaphragm toward or away from at least one stationary capacitor plate formed in a surface of the pressure transducer. In the form shown, the stationary capacitor plate has a surface shape conforming to the deflected surface shape of the diaphragm under pressure, and the stationary capacitor plate surface is positioned to substantially fully support the diaphragm when the diaphragm is subjected to its maximum rated pressure so that overpressures will not destroy or damage the diaphragm. The diaphragm is thus supported fully on the stationary capacitor plate under any overpressure without overstressing the diaphragm.

With the present diaphragm construction, the diaphragm can be made to operate satisfactorily over a high pressure range without becoming excessively stressed. The web portion that connects the outer mounting ring of the diaphragm to the central portion is more highly stressed than a plate diaphragm of uniform thickness would be, but the overall performance of the diaphragm construction is considerably improved over a uniform thickness diaphragm. This is due to the isolation of stresses from the mounting ring, and the resultant minimization of the hysteresis and instability of the diaphragm.

DESCRIPTION OF THE PREFERRED EMBODIMENT

My U.S. Pat. No. 3,618,390 for Differential Pressure Transducer, issued Nov. 9, 1971 shows a typical differential pressure transducer in which the diaphragm of the present invention may be used. Therefore, the construction of the outer housing of the pressure transducer, and the mounting of the sensing cell and the connection for sensing circuitry is omitted, and that portion of the specification of U.S. Pat. No. 3,618,390 is incorporated herein by reference.

Figure 1:
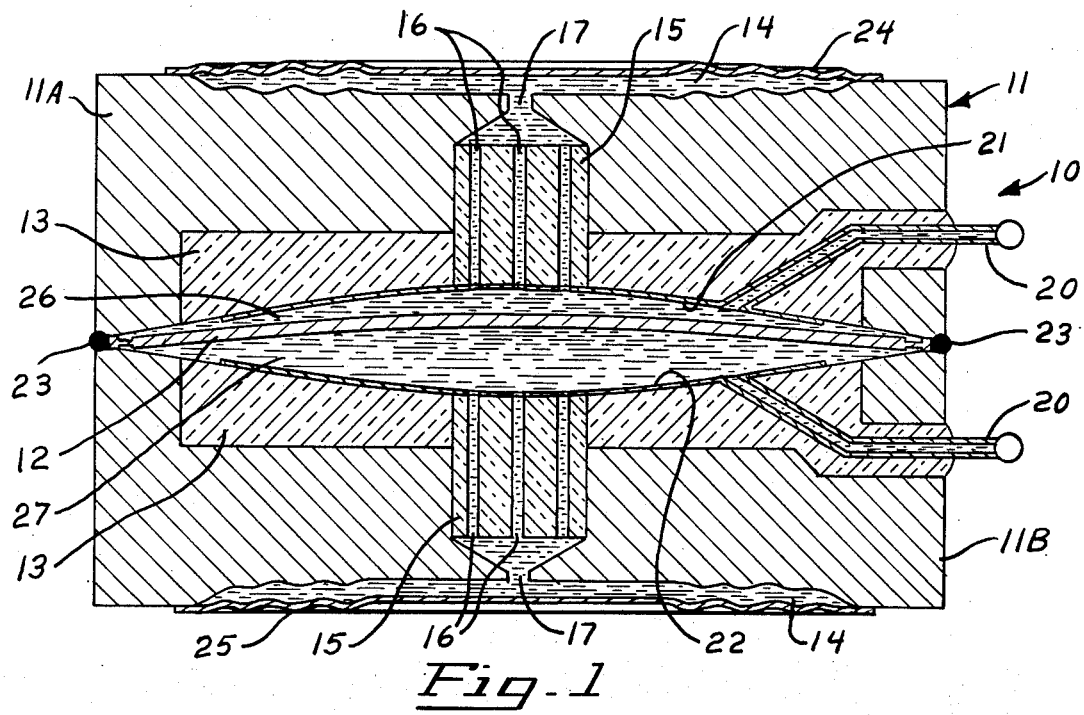
FIG. 1 is a vertical sectional view through a sensing portion of a typical differential pressure transducer utilizing a diaphragm made according to the present invention.

FIG. 1 of the present application corresponds generally to FIG. 4 of U.S. Pat. No. 3,618,390 with the new sensing diaphragm construction in place, and generally includes the sensing cell 10 which comprises a large metal housing 11, which is made into two sections, 11A and 11B that are placed together along a parting line and which are separated by a measuring or sensing diaphragm 12 made according to the present invention. The metal sections 11A and 11B have cup like, circular cross section cavities 13 which are filled with a rigid insulation material, such as a glass or ceramic material. The insulation filling these cavities is placed into the cavities 13 and fused to the metal walls of the sections 11A and 11B. Because the pressure transducer cell illustrated is used with isolating diaphragms that are in contact with the sensed fluid, and the sensing diaphragm 12 is isolated, the cavity sections 11A and 11B each have passageways leading therethrough from the interior to shallow cavities 14 on the opposite sides of each of the housing sections from the glass filled cavities 13. A separate ceramic tube 15 having a plurality of axially extending passageways 16 is positioned in each of the passageways in the housing sections 11A and 11B before the glass filling the cavities 13 is fused into place, and these passageways 16, in connection with an opening 17, provide passageways for fluid or liquid to move between cavities 14 and the pressure sensing chambers formed by diaphragm 12.

Small metal tubes 20 are placed through provided openings in each of the housing sections 11A and 11B, and are fused into place with the ceramic filling material in the cavities 13. The tubes 20 and the ceramic tubes 15 extend out beyond the glass filling when the cavities 13 are filled (the housing is still in two sections at this stage), and the metal tubes 20 also extend out beyond the peripheral wall of the housing sections.

Each of the individual housing sections 11A and 11B is ground off and a concave surface which is, in part, substantially spherical is ground into the surface of each of the housing sections. These concave surfaces are shown in FIG. 1, and after the shape has been made to correspond to the deflection curvature of the diaphragm 12, the concave surfaces are covered with suitable thin metal coatings forming capacitor plates indicated at 21 and 22, respectively. The metal tubes 20 are electrically connected to their respective capacitor plates and form electrical leads for the capacitor plates 21 and 22, which form the stationary capacitor plates for the capacitance type differential pressure sensing cell shown. The passageways 16 in tubes 15 open through the capacitor plates, and the openings or passageways of the tubes 20 also open through the capacitor plates.

After the two housing sections 11A and 11B have been individually prepared, the metal diaphragm 12 is placed between the sections, and is welded into place with a continuous peripheral bead weld 23 which joines the two housings sections 11A and 11B together and holds the diaphragm. The weld 23 also hermetically seals the chambers on the interior of the housing defined between the stationary capacitor plates 21 or 22, and the diaphragm 12.

First and second isolation diaphragms 24 and 25, respectively, are then welded into place around the peripheries of the depressions or cavities 14 formed in each of the housing sections. The isolation diaphragms can be made of thin stainless steel and are corrugated so they will flex easily. The outer surfaces of these isolation diaphragms are open to the pressure to be sensed, through a housing which is shown in U.S. Pat. No. 3,618,390.

When assembled, the sensing diaphragm 12 and the isolation diaphragms 24 and 25 form two chambers which are sealed sensing chambers comprising a first chamber 26, and a second chamber 27. These sensing chambers 26 and 27 are filled with a liquid, which may be a silicone base oil, through the respective tubes 20, and then the tubes 20 are sealed at their outer ends. The tubes 20 are used as leads in the capacitor plates after the chambers have been filled. The electrical lead to the diaphragm 12, which is the movable capacitor plate, can be connected to the housing 11. Because the chambers 26 and 27 are completely filled and also the passageways 16 in the tubes 15, and the chambers 14, any differential pressure on the isolation diaphragms 24 and 25 will cause a deflection of the main sensing diaphragm 12 with respect to one of the other of the stationary capacitor plates 21 or 22. When initially filled, and with the isolation diaphragms at equal pressure, the diaphragm 12 will extend substantially straight and midway between the stationary capacitor plates 21 and 22.

The unit is constructed so that the stationary capacitor plates 21 and 22 are conformed generally to the deflection curvature of the main sensing diaphragm 12, and are positioned so that they will substantially fully support the diaphragm 12 across its entire working surface when the diaphragm 12 is subjected to its maximum rated pressure.

Figure 2:
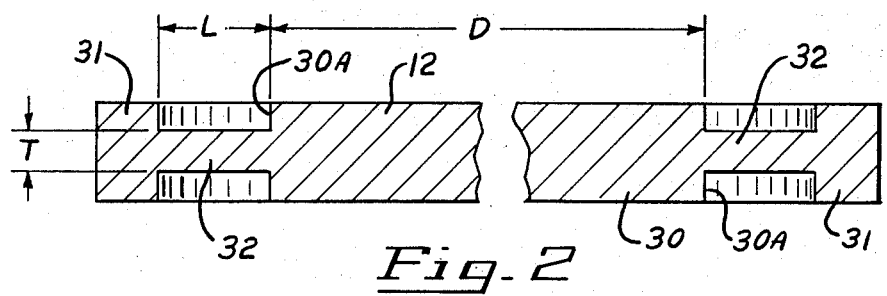
FIG. 2 is a vertical sectional view of a diaphragm made according to the present invention with parts broken away from the center portion.

It can be seen that the main sensing diaphragm 12 is supported at its outer edge and it is supported all around the periphery. Referring now to FIG. 2, a diaphragm made according to the present invention is shown and includes a center sensing portion 30.

The center portion 30 of the sensing diaphragm 12 is circular in plan view. Also, the outer periphery of the diaphragm 12 is circular. As shown, the diaphragm 12 has an outer mounting ring 31 that is connected to the sections 11A and 11B at its outer edges with the weld 23, and this ring 31 (which is an annular ring) is connected to the center sensing section 30 with a thin web 32. When the diaphragm center portion 30 deflects under pressure, the radial bending stresses at the outer corner where edge surface 30A joins the sensing surface of the center portion 30 will be substantially zero and therefore the main center portion 30 performs nearly equal to a true "free edge" diaphragm in its pressure deflection characteristics. The "free edge" diaphragm is characterized by having a zero radial bending moment at its edge. The condition permitting the center portion 30 to act as a free edge diaphragm is accomplished when the slope of the deflection curve at the corner where edge surface 30A joins the sensing surface of center portion 30 (or the angle of edge surface 30A with respect to a reference plane parallel to the undeflected diaphragm) is substantially the same as the slope of the deflection curve of the web 32 where it joins edge surface 30A, under the pressure loading to the entire diaphragm assembly.

Thus, by having an outer mounting ring 31 that is attached to the housing, and having a thin web 32 of some radial length joining the outer ring 31 and the center diaphragm portion 30, the center diaphragm portion 30 is substantially isolated from its mounting ring so that hysteresis and instability effects are minimized. The bending moments at the outer mounting edges are substantially reduced, and the center portion 30 acts like a "free edge" diaphragm.

Figure 3:
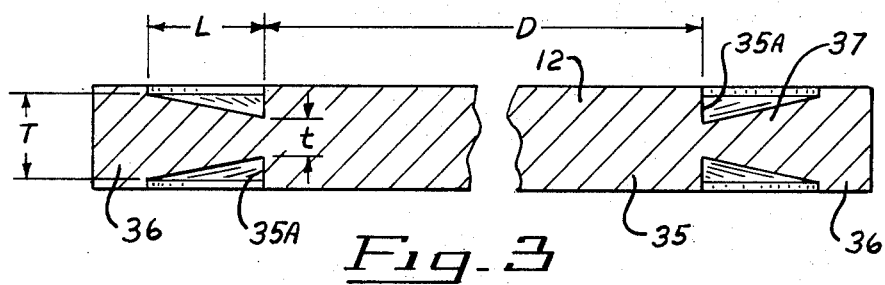
FIG. 3 is a vertical sectional view of a modified form of the diaphragm of FIGS. 1 and 2.

In FIG. 3, a modified sensing diaphragm 12 is shown. In this particular form, the sensing diaphragm 12 has a center sensing portion 35, a mounting ring 36, and a joining web portion 37. The web portion 37 is nonuniform in thickness, varying from its greatest thickness "T" at its outer edges where it joins ring 36, to a minimum thickness "t" where it joins the center portion 35. The corners where the edge surface 35A of the center diaphragm portion 35 meets the sensing surfaces of the center portion 35A also move like a free edge diaphragm, and the tapered or variable thickness web 37 provides a section where the bending stresses are more evenly distributed over the length (radial length) of the web so that maximum stress is lower than would be found in the uniform thickness web 32 of FIG. 2. The design shown in FIG. 3 is preferred for highest pressure ranges, but is more complex to manufacture. It does have the advantage of reducing the level of maximum stress and therefore increasing the pressure range can be employed with the sensing diaphragm assembly 12 while retaining the benefits of the center portion 35 behaving substantially like a "free edge" diaphragm, and also isolating the clamped ring 36 from the main diaphragm portion 35.

With a radial length "L" for the webs, as shown in FIGS. 2 and 3, and a typical diaphragm diameter (D) of one and one-half inches, the D/L may vary between 6 and 60. The ratio of L/T is typically greater than 0.5 and less than 5.0. For the design of FIG. 3, the ratio of T/t is equal to or greater than 1, and preferrably no greater than 4.

It should be noted that the diaphragm constructions of FIGS. 2 and 3 permit use of the diaphragm in differential configuration, or in other words where the deflection characteristics are substantially the same in both directions of deflection of the diaphragm in use.

It should be noted that the edge surfaces 30A and 35A are cylindrical and form right angles with the sensing surfaces of the center portions 30 and 35. The web joins the edge surfaces with only a very small fillet or radius.

What is claimed is:

1. A pressure transducer of the capacitance type having a housing including a surface defining a first capacitor plate, and a diaphragm mounted to be deflected under pressure with respect to said first capacitor plate; said diaphragm comprising a central sensing portion comprising a disc member having a sensing surface and a bisecting reference plane generally parallel to the sensing surface, a peripheral mounting ring symmetrically located with respect to said bisecting plane and fixedly, rigidly mounted on said housing, and an annular web portion extending radially to join said ring and said central portion; said web being substantially thinner than the central portion at the junction of the web and central portion, said web portion extending symmetrically in direction of said bisecting plane and being defined by generally flat surfaces on opposite sides of said bisecting plane, said flat surfaces being of length in direction between the ring and the central portion in relation to the size of the central portion so that the central portion deflection under pressure substantially corresponds to the deflection of a free edge diaphragm.

2. The pressure transducer of claim 1 wherein said housing comprises a metal structure, and wherein the ring is welded to the housing to prevent movement of the ring relative to the housing during deflection of said central portion.

3. The pressure transducer of claim 1 wherein the central portion has a peripheral edge surface, and the major portion of the edge surface of the central portion is substantially perpendicular to the sensing surface of the diaphragm and said edge surface is joined to the flat surfaces of said web with small fillets.

4. The pressure transducer of claim 1 wherein said surface defining said first capacitor plate is configured to substantially conform to the shape of said diaphragm as said diaphragm is deflected toward said first capacitor plate, said first capacitor plate being spaced from the diaphragm a distance whereby said central portion is supported substantially across its entire sensing surface by said first capacitor plate when said diaphragm is subjected to a preselected maximum pressure.

5. The pressure transducer of claim 1 wherein said housing is constructed in two sections, said first capacitor plate being positioned on a first housing section, and a second surface of a second housing section defining a second capacitor plate, said diaphragm being mounted to said housing between said first and second capacitor plates, and means to permit subjecting said diaphragm to differentials in pressure on its opposite side surfaces.

6. The pressure transducer of claim 1 wherein said central portion is circular, and has a diameter D, and said web extends in radial direction between the central portion and said ring a distance L, and wherein the ratio D/L ranges between 6 and 60.

7. The pressure transducer of claim 6 wherein said web extends in radial direction a distance L, and said web is of a substantially uniform thickness t, and wherein the web is constructed to a proportion whereby the ratio L/T is greater than 0.5 and is less than 5.0.

8. The pressure transducer of claim 6 wherein the web extends annularly around the central portion and increases in thickness in radially outward direction from a thickness $t$ adjacent the edge of said central portion to a thickness T adjacent said ring and the ratio of T/$t$ is equal to or greater than 1 and is no greater than 4, with T being no greater than the thickness of the central portion.

9. A pressure transducer having a housing, a diaphragm mounted to be deflected under pressure, means to sense deflection of said diaphragm under pressure; said diaphragm comprising a disc shaped central sensing portion, a peripheral mounting ring fixedly, rigidly mounted on said housing and surrounding said disc shaped central portion, and a web portion extending radially from the central portion and joining said ring and said central portion; said web portion being substantially thinner than the central portion where the web and central portion join and being of length in radial direction between the ring and the central portion in relation to the size of the central portion so that the central portion deflection under pressure substantially corresponds to the deflection of a free edge diaphragm, said web portion being not substantially thinner throughout its radial outward length than it is where it joins said central portion.

10. The pressure transducer of claim 9 wherein said web portion increases in thickness in direction radially outwardly from the central portion to the ring.

11. The combination as specified in claim 9 wherein said disc shaped central sensing portion has a sensing surface, and an annular edge surface substantially perpendicular to said sensing surface, surrounding said disc shaped central portion, and said web portion being defined by substantially planar surfaces, at least one of which joins said edge surface of said central portion with a small fillet.

12. The combination as specified in claim 9 wherein said disc shaped central sensing portion has at least one sensing surface, and a reference plane parallel to said sensing surface and passing through at least portions of said central portion, said web being defined by a pair of generally radially extending flat surfaces positioned symmetrically with respect to said plane, and extending between said peripheral mounting ring and said central sensing portion.

* * * * *